(12) United States Patent
Husband et al.

(10) Patent No.: US 8,873,205 B2
(45) Date of Patent: Oct. 28, 2014

(54) CURRENT LIMITER

(71) Applicant: Rolls-Royce PLC, London (GB)

(72) Inventors: Stephen Mark Husband, Derby (GB); Alexander Charles Smith, Holmfirth (GB); Roger Shuttleworth, Stockport (GB); Xiaoze Pei, Manchester (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/746,635

(22) Filed: Jan. 22, 2013

(65) Prior Publication Data

US 2013/0194703 A1 Aug. 1, 2013

(30) Foreign Application Priority Data

Jan. 26, 2012 (GB) .................................. 1201263.9

(51) Int. Cl.
*H02H 7/00* (2006.01)
*H02H 9/02* (2006.01)

(52) U.S. Cl.
CPC ................ *H02H 9/023* (2013.01); *Y02E 40/69* (2013.01)
USPC .............................................. 361/8; 361/19

(58) Field of Classification Search
USPC .................................................. 361/8–12, 19
See application file for complete search history.

(56) References Cited

U.S. PATENT DOCUMENTS

| 3,704,391 | A | 11/1972 | McConnell | |
| 5,617,280 | A * | 4/1997 | Hara et al. | ....................... 361/19 |
| 6,570,747 | B1 | 5/2003 | Paul | |
| 2012/0236440 | A1 * | 9/2012 | Amato et al. | ................... 361/19 |

FOREIGN PATENT DOCUMENTS

| CA | 2256571 A1 | 6/1999 |
| DE | 199 47 411 A1 | 4/2001 |
| EP | 0 926 797 A2 | 6/1999 |

OTHER PUBLICATIONS

May 9, 2012 Search Report issued in British Application No. 1201263.9.

* cited by examiner

*Primary Examiner* — Danny Nguyen
(74) *Attorney, Agent, or Firm* — Oliff PLC

(57) ABSTRACT

This invention relates to a current limiter comprising a first circuit portion arranged in parallel with a second circuit portion, the first circuit portion comprising a superconductor element arranged in series with a switching arrangement, the second circuit portion comprising a load element, the superconductor element being disposed within a cooling chamber, and the cooling chamber and the switch being disposed within a vacuum chamber, wherein the switching arrangement comprises: a mechanical actuator which is operable between a closed condition in which current is conducted through the first circuit portion and an open condition in which current is diverted from the first circuit portion through the second circuit portion and a controller for monitoring and operating the switch.

16 Claims, 2 Drawing Sheets

CURRENT LIMITER

This invention relates to current limiters and is particularly, although not exclusively, concerned with resistive superconducting fault current limiters.

Superconducting fault current limiters are used to protect circuit components from current surges caused by faults by reducing the magnitude of the current in the circuit during a surge. Superconducting fault current limiters comprise both inductive and resistive fault current limiters.

A resistive superconducting fault current limiter comprises a superconductor element arranged in series with a circuit to be protected. The superconductor element has a critical temperature below which the superconductor element is superconducting. Above the critical temperature, the superconductor element becomes a semi-conductor. In addition to the critical temperature, the superconductor element has a critical current density. The critical current density is the density of current within the superconductor above which the superconductor element will no longer be superconducting. Therefore, when the current density in a superconductor element exceeds the critical current density, the superconductor element will become a resistive conductor. The critical current density of a superconductor element is dependent on the temperature of the superconductor element. For example, a superconductor element at a low temperature may have a larger critical current density than when at a higher temperature.

In use of a resistive superconducting fault current limiter, the superconductor element is cooled below a temperature at which it becomes superconducting for the rated current of the circuit. The superconductor element therefore exhibits no resistance to current flow through it. When a fault occurs which increases the current in the circuit above the rated current, the current density in the superconductor element will exceed the critical current density causing the superconductor element to revert to a resistive state. The superconductor element thus exhibits a resistance/impedance which limits the current in the circuit thereby protecting other components within the circuit from damage from the fault current.

Alternatively, the change from the superconducting to resistive state of the superconductor element can be used to trigger a switch which diverts current through a bypass arrangement (such as a resistor) in parallel with the superconductor element. This arrangement prevents the superconductor element from being heated excessively by prolonged exposure to a high fault current, while enabling the fault current to be maintained for a period of time to allow for fault diagnosis. Once the fault has been corrected, the switch is can be reset by an external operation.

A problem associated with known superconducting fault current limiters is that the switch is designed for ambient environments and is controlled by an external actuating and control system. Furthermore, the switch is designed to operate as fast as possible to limit the superconducting heating effects under fault current. These requirements compromise the performance of the switch, SFCL and additional potential benefits to the surrounding network.

According to a first aspect of the present invention there is provided a current limiter comprising a first circuit portion arranged in parallel with a second circuit portion, the first circuit portion comprising a superconductor element arranged in series with a switch, the second circuit portion comprising a load element, the superconductor element being disposed within a cooling chamber, and the cooling chamber and the switching arrangement being disposed within a vacuum chamber, wherein the switching arrangement comprises: a switch and a mechanical actuator which are operable between a closed condition in which current is conducted through the first circuit portion and an open condition in which current is diverted from the first circuit portion through the second circuit portion, and, a controller for monitoring and operating the switch.

Providing a fault current limiter with a switching arrangement having a mechanical actuator and controller placed within the vacuum chamber which houses the cooling chamber for the superconducting element provides many technical advantages. For example, it allows the switching speed of the switching arrangement to be improved due to the lack of air resistance. This means that the SFCL is isolated more rapidly and accurately, either instantly or after a predetermined amount of time has passed. In addition using an embedded controller also reduces the operational delay time to trigger the actuator. This system allows control of the switching operation such that a number of different operating regimes maybe employed to the benefit of the SFCL and/or network to which is connected depending on the application. It also improves the thermal integrity of the cooling system as the fault current limiter can be entirely self-contained. Hence, the cooling burden can be reduced which makes the unit more efficient. Having a self-contained fault current limiter also provides significant other benefits in terms of installation and maintenance of the fault current limiter.

The switch may be disposed between an outer wall of the vacuum chamber and the cooling chamber.

The load element may be disposed externally of the vacuum chamber.

The current limiter may be an integrally formed unit.

The switch may further comprise a sensor arranged to sense a current density in the superconductor element, and the controller is arranged to receive an output of the sensor, the controller being configured to operate the switch at a predetermined time, and when the current density in the superconductor element is equal to or greater than the critical current density of the superconductor element.

The controller may be externally configured by an external communication link.

The controller may be configured to operate the switch at a first ac current-zero crossing point.

The controller may be configured to monitor the electrical condition of a network of which the current limiter is part, and operate the switch when a predetermined change is detected.

The electrical condition may be a fault current. The predetermined change may be a step change or ramp change in current. The step or ramp change may relate to the isolation of the faulted circuit.

A current limiter as claimed in any preceding claim, further comprising a capacitive forced commutation circuit which is configured to enable a dc zero current switching.

A current limiter as claimed in any preceding claim, wherein the controller is configured to operate the switch in a pulsed mode providing current and phase pulses into a network.

Providing a pulsed current in this way can allow discrimination of the network and detection of a fault location.

The sensor may comprise a means for determining a voltage drop across the superconductor element.

The controller may be configured to automatically close the switch.

The switch may further comprise a bias which biases the switch into the closed condition and an actuator which is actuable against the bias to open the switch, the bias being arranged such that the bias acts to close the switch when the actuator is released.

The switch may further comprise a capacitor, the capacitor being arranged to charge when the switch is closed, and discharge when the switch is open, the capacitor being connected to the actuator such that actuation of the actuator is maintained during discharge of the capacitor to delay closing of the switch for a predetermined period of time after opening of the switch.

The current limiter may comprise a temperature sensor which is arranged to sense the temperature of the superconductor element, the controller being arranged to receive an output of the temperature sensor and being further configured to close the switch when the temperature of the superconductor element is not greater than a predetermined temperature.

For a better understanding of the present invention, and to show more clearly how it may be carried into effect, reference will now be made, by way of example, to the accompanying drawings, in which.

Figure 1:
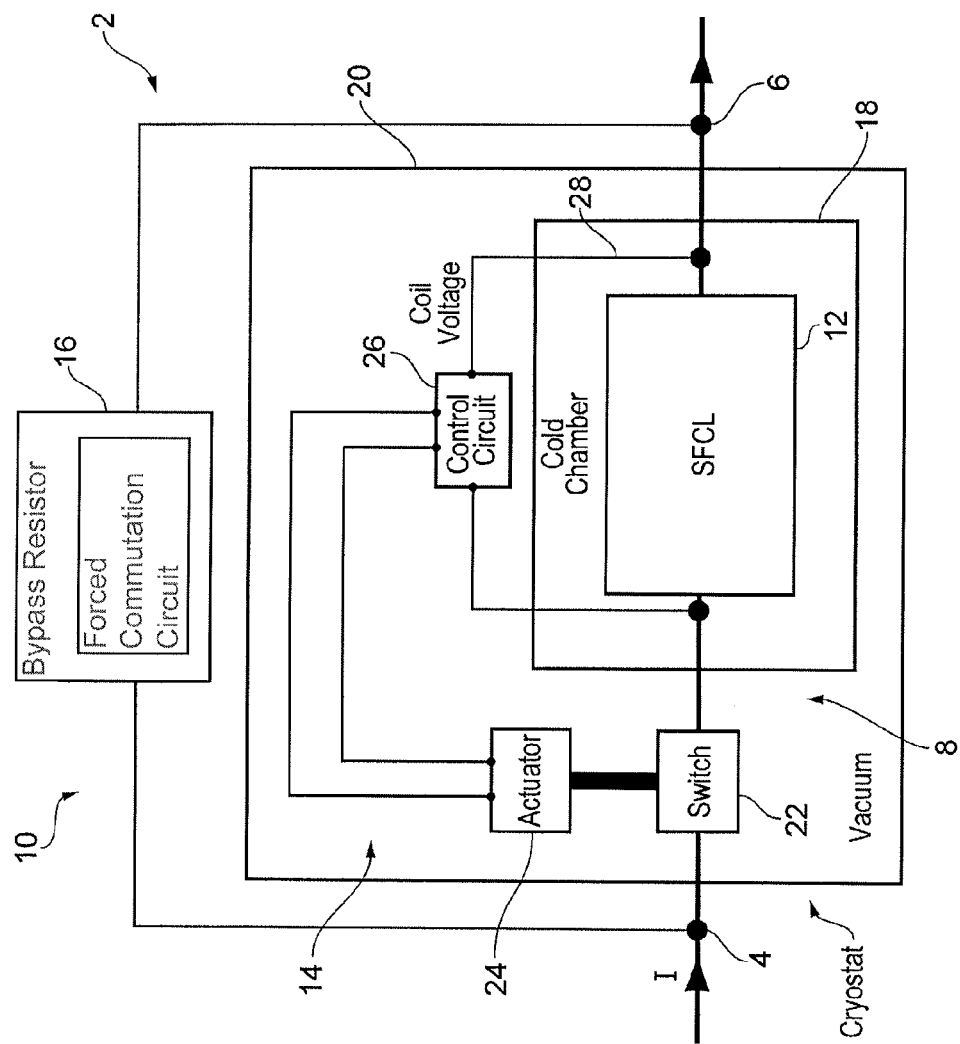
FIG. 1 is a schematic representation of a fault current limiter.

FIG. 1 shows a current limiter 2 in the form of a resistive superconducting current limiter having an input terminal 4 and an output terminal 6. A first circuit portion 8 and a second circuit portion 10 are connected in parallel between the input and output terminals 4, 6.

The first circuit portion 8 comprises a superconductor element 12 and a switching arrangement 14. The switching arrangement 14 and the superconductor element 12 are connected in series between the input and output terminals 4, 6. The superconducting element 12 is formed as a coiled element.

The second circuit portion 10 comprises a load 16 which is an electrical load diagrammatically shown in the form of an electrically resistive element. The second circuit portion 10 provides a bypass for the first circuit portion 8.

The superconductor element 12 is disposed within a cooling chamber 18. The cooling chamber 18 is a cryogenic chamber which is suitable for cooling the superconductor element 12 to temperatures at which the superconductor element 12 becomes superconducting.

The cooling chamber 18 is surrounded by a vacuum chamber 20 which, when evacuated, thermally insulates the cooling chamber 18 from the ambient conditions.

The switching arrangement 14 is disposed within the vacuum chamber 20 between the cooling chamber 18 and an outer wall of the vacuum chamber 20. The switching arrangement 14 comprises a switch 22, a mechanical actuator 24 for opening and closing the switch 22 and a controller 26 for operating the actuator 24. The switch 22 is biased towards a closed condition by a suitable biasing element (e.g. a spring or magnet). The switch 22 may be a power electric switch.

The switching arrangement 14 also comprises a sensor 28 arranged to determine whether the current density in the superconductor element 12 exceeds the critical current density of the superconductor element 12. In the embodiment shown, the sensor 28 comprises a means for sensing a voltage drop across the superconductor element 12 which can be used to determine whether the current density in the superconductor element 12 is greater than the critical current density.

Figure 2:
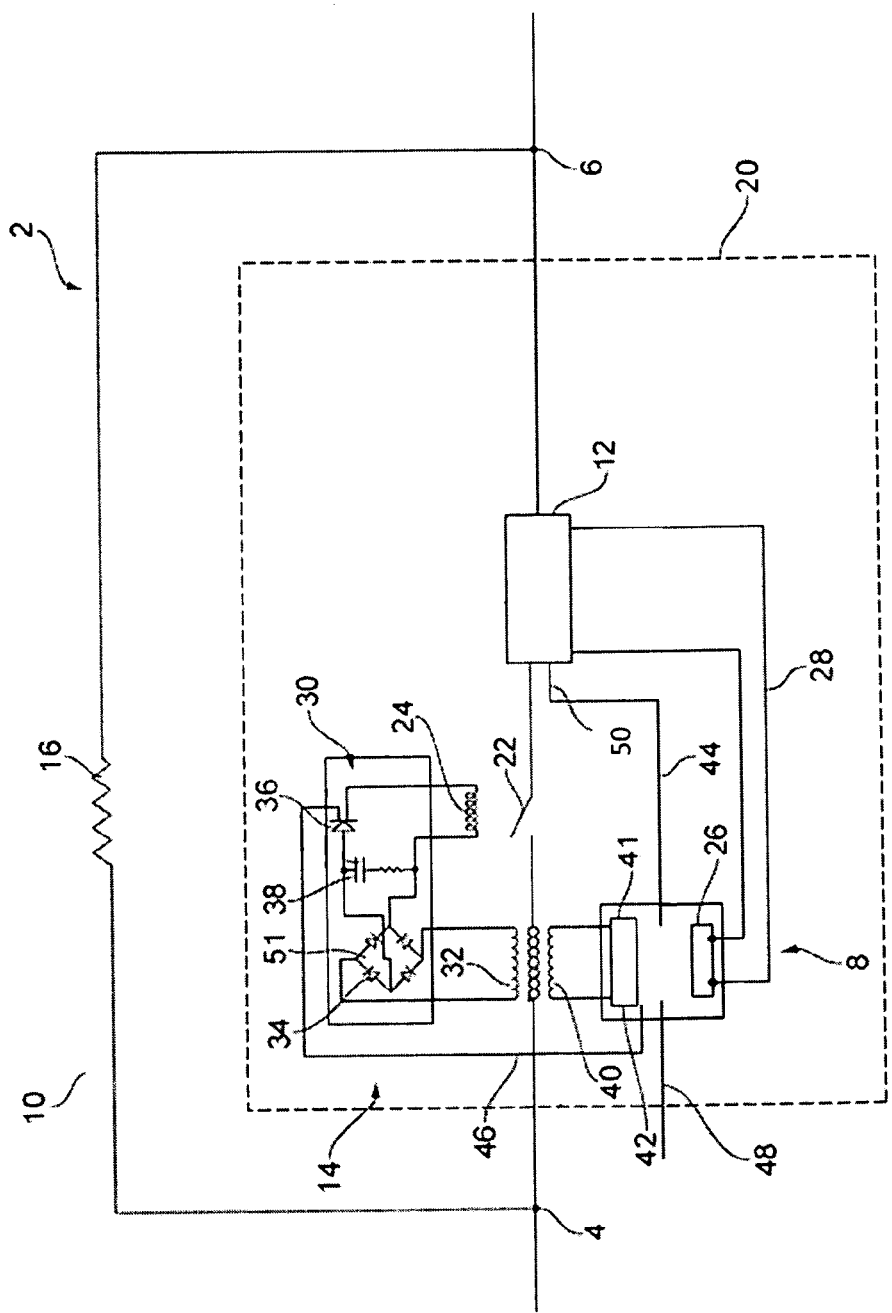
FIG. 2 is a diagram showing the components of the fault current limiter shown in FIG. 1.

The switching arrangement 14 is shown in more detail in FIG. 2. The switching arrangement 14 further comprises a switch card 30 for controlling the actuator 24. The switch card 30 comprises a transformer 32 which is electrically coupled with the first circuit portion 8. The switch card 30 also comprises a rectifier 34, a control switch 36 and a capacitor 38. The capacitor 38 and the actuator 24 are electrically coupled with the transformer 32, via the rectifier 34. The capacitor 38 is connected in parallel with the actuator 24. The control switch 36 connects and disconnects the actuator 24 from the transformer 32 and the capacitor 38.

The controller 26 comprises a second transformer 40 which is electrically coupled with the first circuit portion 8. A battery 42 is also provided for powering the controller 26. The controller 26 is connected to the sensor 28 for sensing the voltage drop across the superconductor element 12. In addition, the controller 26 is connected by a lead 44 to a temperature sensor which is arranged to monitor the temperature of the superconductor element 12. The controller 26 has an output 46 which is connected to the control switch 36 of the switch card 30.

A communication link 48 is provided for communicating with the controller 26 from outside of the vacuum chamber 20, for example using an additional controller (not shown). The communication link 48 may, for example, be a fibre-optic link or a wireless link; both of which are advantageous because they reduce heat transfer into the vacuum chamber 20 in comparison with conventional wire links.

Prior to use, the input and output terminals 4, 6 are connected to a circuit (not shown) for which fault current protection is required. For this example it is assumed that the connection is to an alternating current supply but it is clear to those in the state of the art that many of the controllable switch benefits are equally applicable to direct current.

The superconductor element 12 is cooled to a temperature at which the critical current of the superconductor element is greater than the rated current of the circuit. The rated current of the circuit may, for example, be the maximum safe current which can be carried by the circuit without damaging circuit components. However, it is recognised that other factors may impose a limit on the rated current for the circuit. The vacuum chamber 20 is evacuated.

In use, the switch 22 is closed and the alternating current through the circuit is supplied through the superconductor element 12. When operated at or below the rated current, the current density in the superconductor element 12 is less than the critical current density. Consequently, the superconductor element 12 provides no, or negligible, impedance to flow of current through the first circuit portion 8. The load 16 resists current flow through the second circuit portion 10. Consequently, substantially all current passes through the first circuit portion 8. There is no, or a negligible, voltage drop across the superconductor element 12.

With the switch 22 closed, the capacitor 38 is charged via the transformer 32 and rectifier 34. The rectifier 34 rectifies the alternating current produced by the transformer 32 to a direct current. The control switch 36 is initially open which disconnects the actuator 24 from the transformer 32 and the capacitor 38 and so prevents the actuator 24 from being actuated. The switch 22 therefore remains closed.

In addition, the alternating current passing through the first portion 8 is monitored by the controller 26 via the output of the second transformer 40 to determine the time at which current-zeros of the alternating current occur. A current-zero is the switchover point of an alternating current at which point the current in the first circuit portion 8 is substantially zero. For an alternating current in a resistive fault current limiter, the current and the voltage are in phase. Therefore, the current-zero also corresponds to a voltage-zero across the superconductor element 12.

When the current in the circuit increases above the rated current of the circuit, for example as a consequence of a fault in the circuit, the current density in the superconductor element 12 increases above the critical current density. The superconductor element 12 therefore quenches and reverts to a resistive state in which it resists current flow through the first circuit portion 8. The resistance/impedance of the superconductor element 12 causes an increase in the voltage drop across the superconductor element 12. The increase in the voltage drop is detected by the sensor 28 which is outputted to the controller 26. The controller 26 associates the increase in the voltage drop with a current density in the superconductor element 12 which is above the critical current density.

The controller 26 determines when the next current-zero of the alternating current will occur and sends a signal to close the control switch 36 of the switch card 30 at the time of the next current-zero. Closing of the control switch 36 connects the actuator 24 with the transformer 32 thereby actuating the actuator 24 against the biasing element to open the switch 22. Opening the switch 22 interrupts current flow through the first circuit portion 8 and diverts the current through the second circuit portion 10 comprising the load 16. Opening the switch 22 at a current-zero, which coincides closely with a voltage-zero, reduces the impact of the switching operation on the switch 22 and the circuit components. For example, opening the switch 22 at the current-zero prevents arcing between switch contacts which can otherwise degrade the switch 22 and detrimentally affect the switching operation. For a direct current operation the use of a capacitive forced commutation circuit in the load 16, that uses the voltage across the SFCL to charge which then discharges into the switch, will generate a near zero-current across the switch as it operates.

It will be appreciated that the timing of the switching of the control switch 36 by the controller 26 can be adapted to accommodate delays in the response time of the actuator 24 to ensure that the switch 22 is opened at or substantially at a current-zero. It will be further appreciated that where the time until the next current-zero is too short to effect opening of the switch 22, the controller 26 may be configured to instigate opening of the switch 22 at a subsequent current-zero.

Operating the switching arrangement 14 in a vacuum means that air resistance which would otherwise inhibit operation of the mechanical actuator 24 is minimised. Consequently, switching speed is improved. Furthermore, corrosive or oxidising elements which may damage the switching arrangement 14 are prevented from coming into contact with the switching arrangement 14. The current carrying ability of the switching arrangement 14 is therefore greatly improved and arcing is minimised.

Once the switch 22 has opened, the controller 26 is no longer powered via the second transformer 40. Instead, the controller 26 is powered by the battery 42. This ensures that the controller 26 is operational even though current has been diverted from the first circuit portion 8 to the second circuit portion 10. Furthermore, the actuator 24 is no longer powered via the transformer 32. Instead, the actuator 24 is powered by the discharging capacitor 38. Consequently, the switch 22 remains open until the capacitor 38 has discharged, following which the actuator 24 releases and the switch 22 is closed by the biasing element. The advantage of this arrangement is that the switch 22 does not need to be instructed to reset. Consequently, the fault limiter 2 can operate autonomously. The predetermined period of time for which the switch 22 remains open can be varied by increasing the discharge rate and/or capacity of the capacitor 38.

The switching arrangement 14 may comprise a latch (not shown) for latching the switch 22 open. The latch is coupled to the controller 26. If it is determined by the controller 26 that the temperature of the superconductor element 12, as detected by the sensor 44, is above the temperature at which the superconductor element 12 is superconducting for the rated current, then the controller 26 prevents the latch from releasing. This prevents the switch 22 from being closed before the superconductor element 12 has been cooled to a temperature at which it is superconducting.

The controller 26 may be configured to control the temperature of the cooling chamber 18 in order to change the temperature to which the superconductor element 12 is cooled. For example, the controller 26 may be used to increase the temperature of the superconductor element 12 in order to reduce the critical current density of the superconductor element 12 so that the current limiter activates at a lower fault current. This would be advantageous in circumstances in which current limitation is required which is lower than the rated current of the circuit, for instance when components of the circuit are being repaired, replaced or have been disconnected.

The controller 26 may be further tuned to instigate opening of the switch 22 only when the current has exceeded the rated current by a predetermined amount. This can be implemented to prevent undesired interruption of the current through the circuit when a relatively minor fault or current fluctuation occurs. The controller 26 may be configured to control the switching arrangement 14 depending on the type and/or location of the fault within the circuit.

The communication link 48 may be used to communicate with the controller 26. For example, the communication link 48 may be used to configure or re-configure the controller, thereby programming it. Programming the controller may include changing parameters set by the controller 26 such as the temperature of the superconductor element 12 or the delay introduced before switching.

An advantage of disposing the components of the switching arrangement 14 within the vacuum chamber 20 is that the current limiter 2 can be manufactured as an integrated unit. Furthermore, an automatic switching arrangement 14 such as that outlined above enables the current limiter 2 as an integrated unit to be readily incorporated into a circuit without having to provide means for an operator to manually close the switch 22 following a fault.

A variant of the current limiter for use with a circuit having a multi-phase power supply, for example a three-phase power supply, comprises separate switching arrangement for interrupting each phase of the supply independently. The controller is configured to monitor each phase and to determine whether the fault is a single or multi-phase fault and to identify the phases in which the fault has occurred. Each phase for which a fault has occurred can then be interrupted and diverted at a current-zero of that phase.

It is envisaged that the current limiter would be suitable for use with circuits carrying alternating or direct currents.

The current in the second circuit portion or the voltage drop across the load can be monitored by the controller to determine when the fault is no longer present. Clearly when the shorted portion of the circuit is isolated, a step-change in circuit impedance will occur that can be detected by the SFCL sensors. The controller can thus be configured to delay closing of the switch until the fault is no longer present. Under this operation either no load 16 is required or the load 16 could employ a fuse that enables the circuit to operate normally whilst the superconductor cools back to its superconducting state.

The controller can be configured to trip at a pre-determined time either in-line with standards or specific operator requirements such as advised by specific network modelling expectations. This would ensure that the operation of the device is consistent. In some embodiments it will be advantageous to have the controller configured so as to operate the switch as fast as possible.

The controller can be configured to provide a switching regime such that the switch 22 can be opened and closed. For example, the SFCL 12 can have a superconductor that by design rapidly heats. As the resistance of the superconductor is directly proportional to temperature the resistance of the current limiter 2 rapidly increases thereby rapidly reducing the fault current. Using the temperature sensors the controller can open and close the switch to maintain a constant temperature with the SFCL 12. This provides increased design freedom within the current limiter design. In some embodiments, the controller could arranged so as to operate the switch intermittently, thus providing a pulsed signal. This will result in the switch changing between an open and a closed position as required. By appropriate design of the load 16 this will send pulses (both of amplitude and phase) into the faulted circuit that can be used to rapidly and accurately discriminate the fault location within the network the current limiter 2 is connected.

The invention claimed is:

1. A current limiter comprising a first circuit portion arranged in parallel with a second circuit portion, the first circuit portion comprising a superconductor element arranged in series with a switching arrangement, the second circuit portion comprising a load element, the superconductor element being disposed within a cooling chamber, and the cooling chamber and the switch being disposed within a vacuum chamber, wherein the switching arrangement comprises:
   a mechanical actuator which is operable between a closed condition in which current is conducted through the first circuit portion and an open condition in which current is diverted from the first circuit portion through the second circuit portion and a controller for monitoring and operating the switch,
   wherein the switching arrangement further comprises a capacitor, the capacitor being arranged to charge when the switch is closed, and discharge when the switch is open, the capacitor being connected to the actuator such that actuation of the actuator is maintained during discharge of the capacitor to delay closing of the switch for a predetermined period of time after opening of the switch.

2. A current limiter as claimed in claim 1, further comprising a capacitive forced commutation circuit which is configured to enable a dc zero current switching.

3. A current limiter as claimed in claim 1, wherein the controller is configured to operate the switch in a pulsed mode providing current and phase pulses into a network.

4. A current limiter as claimed in claim 1, wherein the switching arrangement further comprises a bias which biases the switch into the closed condition and an actuator which is actuable against the bias to open the switch, the bias being arranged such that the bias acts to close the switch when the actuator is released.

5. A current limiter as claimed in claim 1, wherein the controller is programmed so as in a fault condition after the superconductor has reached a pre-determined temperature the switch is operated to maintain the pre-determined temperature within hysteresis limits.

6. A current limiter as claimed in claim 1, wherein the current limiter comprises a temperature sensor which is arranged to sense the temperature of the superconductor element, the controller being arranged to receive an output of the temperature sensor and being further configured to close the switch when the temperature of the superconductor element is not greater than a predetermined temperature.

7. A current limiter as claimed in claim 1, wherein the switching arrangement is disposed between an outer wall of the vacuum chamber and the cooling chamber.

8. A current limiter as claimed in claim 1, wherein the current limiter is an integrally formed unit.

9. A current limiter as claimed in claim 1, wherein the switching arrangement further comprises a sensor arranged to sense a current density in the superconductor element, and the controller is arranged to receive an output of the sensor, the controller being configured to open the switch at a predetermined time, and when the current density in the superconductor element is equal to or greater than the critical current density of the superconductor element.

10. A current limiter as claimed in claim 9, wherein the sensor comprises a arrangement for determining a voltage drop across the superconductor element.

11. A current limiter as claimed in claim 1, wherein the controller is configured to automatically operate the switch.

12. A current limiter as claimed in claim 1, wherein the controller is configured via an external communication link.

13. A current limiter as claimed in claim 1, wherein the controller is configured to operate the switch at a first ac current-zero crossing point.

14. A current limiter as claimed in claim 1, wherein the controller is configured to monitor the electrical condition of a network of which the current limiter is part, and operate the switch when a predetermined change is detected.

15. A current limiter comprising a first circuit portion arranged in parallel with a second circuit portion, the first circuit portion comprising a superconductor element arranged in series with a switching arrangement, the second circuit portion comprising a load element, the superconductor element being disposed within a cooling chamber, and the cooling chamber and the switch being disposed within a vacuum chamber, wherein the switching arrangement comprises:
   a mechanical actuator which is operable between a closed condition in which current is conducted through the first circuit portion and an open condition in which current is diverted from the first circuit portion through the second circuit portion and a controller for monitoring and operating the switch,
   wherein the switching arrangement further comprises a bias which biases the switch into the closed condition and an actuator which is actuable against the bias to open the switch, the bias being arranged such that the bias acts to close the switch when the actuator is released.

16. A current limiter comprising a first circuit portion arranged in parallel with a second circuit portion, the first circuit portion comprising a superconductor element arranged in series with a switching arrangement, the second circuit portion comprising a load element, the superconductor element being disposed within a cooling chamber, and the cooling chamber and the switch being disposed within a vacuum chamber, wherein the switching arrangement comprises:
   a mechanical actuator which is operable between a closed condition in which current is conducted through the first circuit portion and an open condition in which current is diverted from the first circuit portion through the second circuit portion and a controller for monitoring and operating the switch,
   wherein the controller is configured to operate the switch at a first ac current-zero crossing point.

* * * * *